United States Patent [19]

Holowach et al.

[11] Patent Number: 4,813,608

[45] Date of Patent: Mar. 21, 1989

[54] BIMETALLIC AIR SEAL FOR EXHAUST NOZZLES

[75] Inventors: Joseph Holowach, Cincinnati, Ohio; George D. Lee, West Palm Beach, Fla.

[73] Assignee: The United States of America as represented by the Secretary of the Air Force, Washington, D.C.

[21] Appl. No.: 939,999

[22] Filed: Dec. 10, 1986

[51] Int. Cl.$^4$ .................. B64C 9/38; B63H 11/10; F02C 7/20

[52] U.S. Cl. ................ 239/265.37; 239/265.19; 239/265.39; 60/39.32

[58] Field of Search .............. 239/269.19, 269.37, 239/269.39, 265.43, 397.5; 60/39.32, 685, 757

[56] References Cited

U.S. PATENT DOCUMENTS

| | | | |
|---|---|---|---|
| 2,773,709 | 12/1956 | Smith | 60/39.32 X |
| 2,831,319 | 4/1958 | Geary | 239/265.37 |
| 3,354,649 | 11/1967 | Madden | 60/271 |
| 3,730,436 | 5/1973 | Madden et al. | 239/265.39 |
| 3,892,358 | 7/1975 | Gisslen | 239/265.39 |
| 4,022,948 | 5/1977 | Smith et al. | 428/542 |
| 4,128,208 | 12/1978 | Ryan et al. | 239/265.39 |

FOREIGN PATENT DOCUMENTS 722616  1/1955  United Kingdom ......... 239/265.37

Primary Examiner—Andres Kashnikow
Assistant Examiner—Patrick N. Burkhart
Attorney, Agent, or Firm—Jules J. Morris; Donald J. Singer

[57] ABSTRACT

A bimetallic leaf seal 40 for forming an air seal between adjacent structures (38, 42). The bimetallic seal 40 comprises two metallic layers 46, 48 having different coefficients of thermal expansion. The seal moves in a preferred direction upon the application of heat to form an air seal upon the application of heat.

10 Claims, 2 Drawing Sheets

BIMETALLIC AIR SEAL FOR EXHAUST NOZZLES

STATEMENT OF GOVERNMENT INTEREST

The invention described herein may be manufactured and used by or for the Government for governmental purposes without the payment of any royalty thereon.

TECHNICAL FIELD

This invention relates to elastic leaf seals of the type used to control air leakage between adjacent parts in high pressure exhaust environments. The invention is particularly related to pressure actuated air seals.

BACKGROUND

Elastic leaf seals have been used for many years to control air leakage between movable surfaces. In particular, they have been used in aircraft engine exhaust nozzles where high internal pressure is utilized to push the leaf seal into a sealing position against an adjacent seal surface. One conventional elastic leaf seal design comprises two overlapping metallic members fabricated from thin sheet metal. The members may be slotted or otherwise bent to conform the seal to conical or irregular surfaces and to accommodate thermal growth at the ends of the seal. Since these seals are sometimes susceptible to inelastic buckling from induced thermal stress, slots or gaps are generally used to prevent warping of the seal.

The effectiveness of the seal is primarily dependent upon the initial gap, the flexibility of the seal and the differential pressure across the seal. The thickness of the seal must be adequate to support the pressure differential across it but thin enough to deflect and close a gap between adjacent parts.

If the seal is made too thin, pressure upon the seal may exceed the yield strength of the seal material and result in seal breakage or blow out causing a loss of sealing between the adjacent parts. If the seals are made thicker, exhaust gas pressure may be insufficient to deflect the seal material and to produce a good seal.

To meet these two conflicting requirements the seal thickness is usually held between 0.007 and 0.010 inches thick in jet engine exhaust nozzles. These thin leaf seals are therefore extremely vulnerable to damage during assembly or operation of the exhaust nozzle.

Another problem that arises with elastic leaf seals is due to manufacturing difficulties. When these seals are used for aircraft engine or spacecraft engine nozzles some seals are relatively long. In aircraft engine nozzles 2-4 foot long leaf seals are not uncommon. Since the seals are made from very thin leaves of sheet metal it is very difficult to hold tolerances between the leaf seal and the part to which it seals. Variations in part tolerances result in large variations in the gap between the seal and its adjacent part. Although a gap of 0.002 to 0.003 inches may be desired, normal variations results in seal gaps as large or larger than 0.050 inches at some location along the length (or circumference) of the seal.

Large gaps may result in the leaf seal failing to move into its preferred sealing position due to excess exhaust gas leakage causing the seal to flutter. Exhaust gases would therefore continue to escape from the nozzle resulting in a loss of directed thrust for the aircraft it is associated with. In some instances the loss of exhaust gases can result in thermal damage to the surrounding nozzle structure due to high temperature exhaust impinging upon insufficiently cooled structures.

In view of the above a need exists for an improved air seal for high temperature and high stress environments.

It is an object of this invention, therefore, to provide a seal capable of withstanding the harsh conditions of an aircraft engine exhaust environment.

It is further object of this invention to provide a seal capable of sealing between movable parts without reliance on a pressure activated sealing arrangement.

SUMMARY OF THE INVENTION

The invention comprises a leaf seal for use in high temperature environments to form an air seal between adjoining structures. The leaf seal comprises two distinct metallic layers having substantially different coefficients of expansion. The two metallic layers are bonded together so that their differing rates of expansion will cause the seal to bend (curl) in a preferred direction upon the application of heated exhaust gases. The bending of the seal in the preferred direction results in the formation of a tight air seal between adjoining structures.

In the preferred embodiment of the invention, the invention comprises a stainless steel metallic layer and a nickel alloy metallic layer. The material with the lowest coefficient of thermal expansion forms the surface that seals against the movable structure. The preferred seal is capable of withstanding temperatures in excess of 1000° F.

In some preferred embodiments of the invention, the seal further comprises a stabilized trailing edge. The stabilized trailing edge consists of the folded back portion of leaf seal material which counteracts seal warping.

In a refinement of the preferred embodiment of the invention the bimetallic leaf seal is less than 0.040 inches thick and the seal is capable of closing gaps as large as 0.050 inches when subjected to heated exhaust gas.

In yet in another preferred embodiment, the seal comprises slots through one of the two metallic layers. The slots reduce lengthwise thermal warping that might otherwise reduce the sealing capability of the bimetallic seal.

In a preferred use the invention is utilized to control exhaust air leakage in a variable two dimensional jet engine exhaust nozzle. The seal is used between adjacent components and is actuated by thermal expansion. Differential air pressure across the seal improves sealing.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
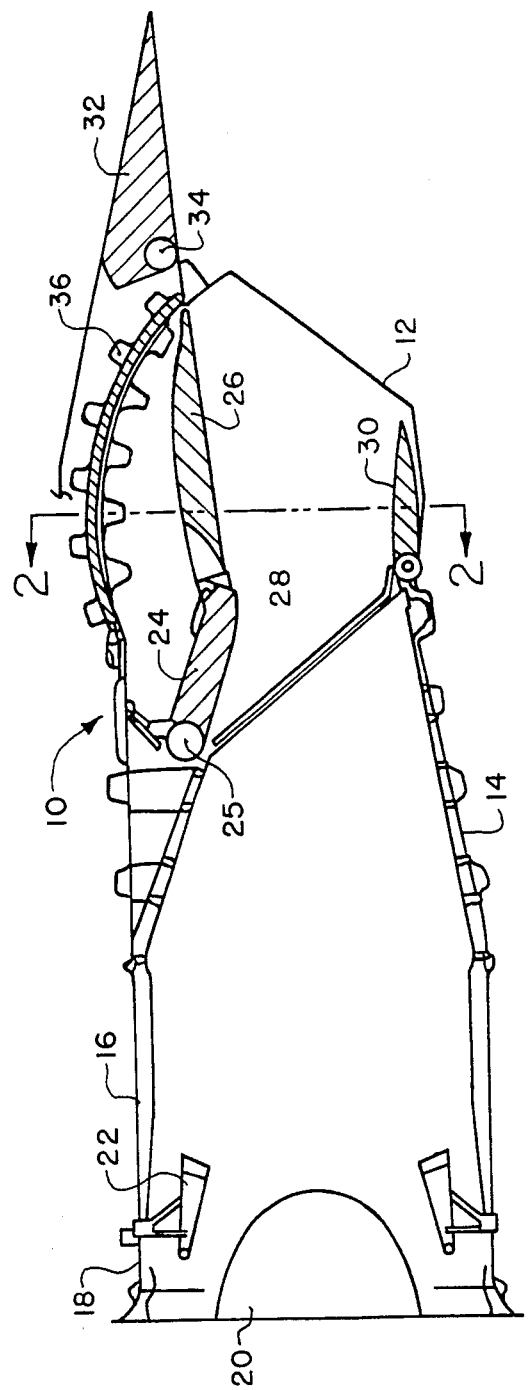
FIG. 1 is a cross-sectional representation of a jet engine tail pipe and exhaust nozzle.
Figure 2:
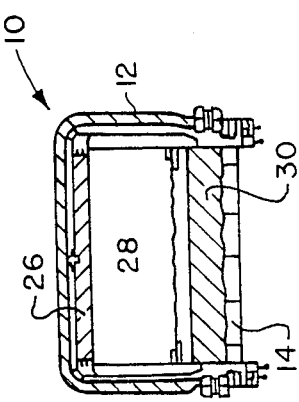
FIG. 2 is a cross-section of FIG. 1 taken along line 2—2.

FIGS. 1 and 2 show a two dimensional jet engine exhaust nozzle utilizing bimetallic air seals which are shown in detail in the expanded views of FIGS. 3 through 9. The two dimensional (2-D) exhaust nozzle 10 is so called because its cross-section is generally rectangular as is shown in FIG. 2. Conventional nozzles generally are conical, and often utilize substantially different sealing arrangement.

The two dimensional exhaust nozzle comprises a variable exhaust section 12 and a engine transition section 14. The transition section directs air from the jet engine tail pipe 16, which is round into the variable exhaust area 12 which is rectangular. The engine tail pipe 16 is connected to the rear end of an engine casing 18 which is part of a jet engine 20. For military or other supersonic aircraft the tail pipe is typically equipped with an afterburner nozzle ring 22. The afterburner injects ignited fuel into the turbine engine exhaust to increase the temperature and pressure of the exhaust stream powering the aircraft.

This type of 2-D nozzle has several advantages over the conventional nozzles. The 2-D nozzles control airflow with a minimum of moving parts. Inside the nozzle there is a primary flap 24 and a secondary flap 26. The primary flap 24 can be rotated clockwise to close down the exhaust area 28 between the upper flaps 24, 26 and a ventral flap 30. In some instances there are multiple ventral flaps similar to primary and secondary flaps 24, 26. Additional ventral flaps make it possible to close down the nozzle area 28 even further than with the nozzle shown in FIG. 1. Most conventional nozzles have in excess of 30 parts which through their movement change the nozzle exhaust opening. The 2-D nozzle has far fewer moving parts than conventional nozzles and is therefore much more reliable. The 2-D nozzles are also easier to cool than conventional nozzles since there are less interfering movable parts.

Nozzles such as shown in FIG. 1 permit easy vectoring of thrust. By directing the engine exhaust flow many complex maneuvers can be performed by an aircraft in flight. Further, the design of short take-off or vertical take-off and landing aircraft becomes much easier.

Engine thrust is directed by means of a thrust vectoring flap 32. The vectoring flap 32 can rotate around hinge 34 to vector the exhaust flow from the nozzle 12. A deflector 36 is used during take-off and landings. Deflector 34 moves clockwise into the exhaust stream to direct airflow towards the ground.

Two dimensional nozzles also have lower installed drag on the aircraft than conventional nozzles. This results in improved aircraft lift.

Unfortunately, 2-D nozzles have been limited in their usefulness because of problems relating to exhaust loss between the movable parts and their stationary attachment points. Various leaf seals such as those discussed in the background, have been used to try to reduce this problem, the seal of this invention however, provides positive sealing which is more reliable than the previously used leaf seals.

Figure 3:
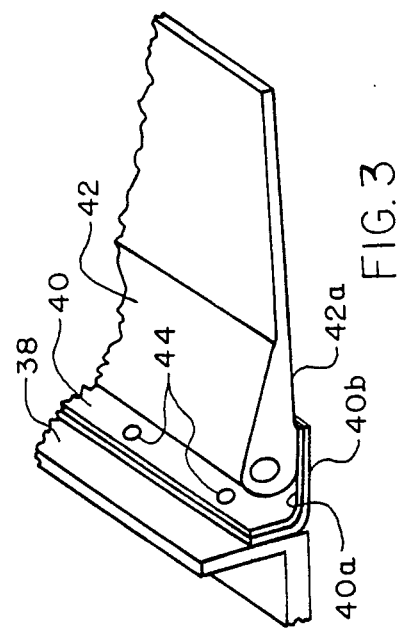
FIG. 3 is a partial perspective view of a bimetallic seal forming an air seal between a stationary support and an exhaust flap.

FIG. 3 shows an attachment flange 38, a leaf seal 40 and a flap 42 similar to ventral flap 30 of FIG. 1. This arrangement is also used at attachment point 25 for the primary flap 24 and attachment point 34 for vectoring flap 32. If exhaust was to escape in large quantities at any of these attachment points directed exhaust for powering the aircraft is lost and aircraft efficiency greatly suffers.

The elastic leaf seal 40 is mounted to a stationary mounting frame 38 by means of rivets or other fasteners 44. The seal wraps under and adjacent to the lower surface 42a of the flap 42. Due to manufacturing tolerances gaps can be formed between the upper surface of the seal 40a and the lower surface of the flap 42a along the length of the seal.

The seal 40 consists of a bimetallic plate comprising two metallic sheets 46 and 48. The two materials differ greatly in their coefficients of thermal expansion. During engine operation the seal heats up to an operating temperature, as a result of the difference in the ratio of thermal expansion of the seal materials the seal deflects in a preferred direction until it closes any gap between the seal and the flap.

The seal will always curl or bend inward to the side of the plate having the lower coefficient of thermal expansion. In view of FIG. 4 material 46 has the lower coefficient of thermal expansion and therefore the sealing surface 40a of seal 40 is shown bent upward in dotted lines. The ability of the seal to close a gap is therefore independent of the pressure differential across it. Increased pressure on inside the nozzle will, however, increase the effectiveness of the seal 40 by pressing on lower surface 40b of the seal.

Figure 5:
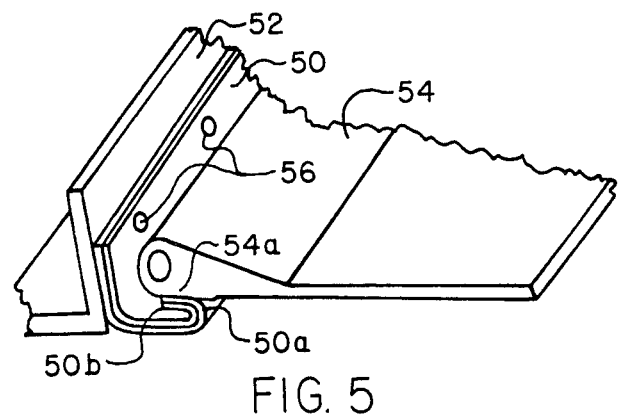
FIG. 5 is a partial perspective view of a bimetallic seal forming an air seal between a stationary support and a movable flap, the bimetallic seal having a stabilized trailing edge.
Figure 6:
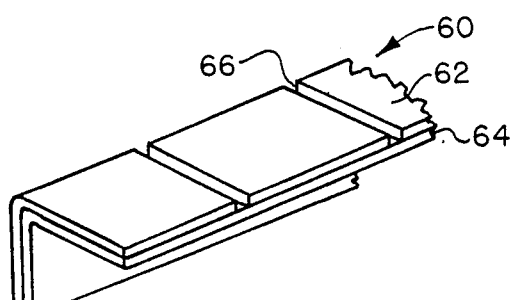
FIG. 6 is a partial perspective view of a bimetallic seal having slots to prevent warping.

FIG. 5 is a partial perspective view of a leaf seal flap and attachment flange similar to FIG. 3. Leaf seal 50 however, represents a slightly different embodiment of the invention which incorporates a stabilized trailing edge.

Leaf seal 50 is attached to a flange 52 to seal between flange 52 and a flap 54. The seal 50 is attached to the flange with fasteners 56. Seal 50 differs from the seal discussed above by further comprising a stabilized trailing edge 50a. The stabilized edge prevents length wise thermal warping of the seal from causing air gaps to form between flap sealing surface 54a and seal surface 50b. A length wise warp can sometimes be generated by the different thermal coefficients of expansion of the two materials making up the bimetallic leaf seal. This would cause the seal to bow away from seal surface 54 at its center. The stabilized trailing edge 50a counteracts this tendency through the geometric reversal of the two metallic sheets at the sealing edge.

Another way of preventing warping of the bimetallic seal is to provide for slots in the seal portion having the higher coefficient of thermal expansion. Seal 60 in FIG. 6 comprises a first metallic layer 64 and a second metallic layer 62. Layer 62 has a higher coefficient thermal expansion than layer 64. Slots 66 in layer 62 allow for layer 62 to grow length wise faster than layer 64. This reduces the likelihood that the seal 60 will bow or warp away from its adjacent sealing surface.

Figure 7:
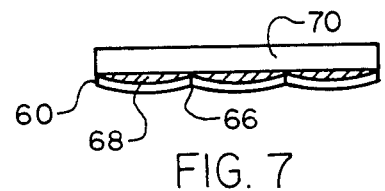
FIG. 7 is a plan view of the bimetallic seal of FIG. 6.

FIG. 7 shows, in exagerated detail, the contribution of slots 66. Instead of having a very large warp disrupting the sealing between sealing surface 70 and seal 60, small bows 68 are formed between slots. These small bows, if they form, would only allow relatively small amounts of gas to escape at this joint. The many small bows 68 of a bow amplitude have a much lower leakage area than if the seal warped into one large bow.

Figure 8:
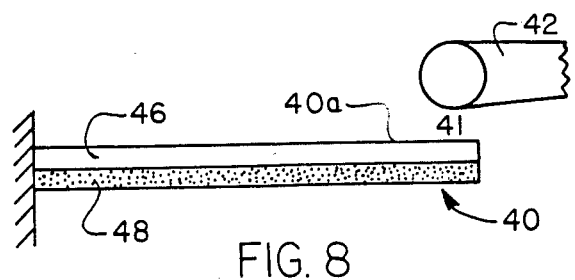
FIG. 8 is a schematic representation of a seal and a flap hinge.
Figure 9:
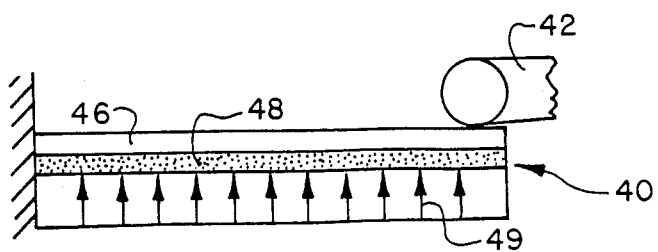
FIG. 9 is a schematic representation of a seal and flap hinge under pressure.

FIG. 8 shows a situation where manufacturing tolerances or misassembly have resulted in a gap between flap 42 and seal 40. In this situation the thermal generated curl of the seal 40 would close the gap 41 between the flap 42 and upper surface of the seal 40a. FIG. 9 represents the case where no gap exists between the seal and the flap 42. Arrows 49 represent the high pressure exhaust impinging on the seal 40. These pressure forces result in a net force pushing seal 40 against flap 42 and improving the sealing therebetween.

Figure 4:
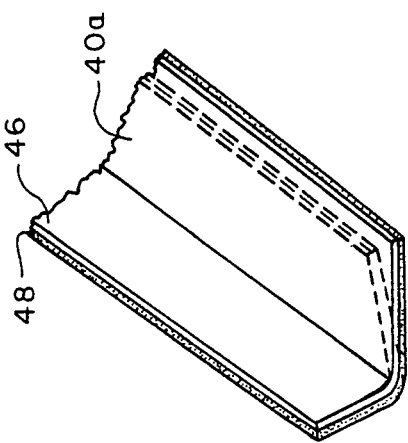
FIG. 4 is a partial perspective view of a bimetallic seal which shows the activated position of the seal in dotted lines.

One example of a preferred bimetallic seal comprises layers of INCONEL 718 and A286 stainless steel. Since the stainless steel A286 has a greater coefficient of expansion than the INCONEL 718 this results in the stainless layer curling about the INCONEL layer (as shown in FIG. 4 when layer 48 is the stainless steel A286 and layer 46 is the INCONEL 718).

To close an air gap ($\delta$) of up to 0.05 inches (i.e., FIG. 8) at temperature (T) of 1000° F. these two metals are a good choice. The thermal coefficient of expansion difference ($\Delta \alpha$) of INCONEL 718 versus stainless steel A286 is $2 \times 10^{-6}$ in./in. ° F. This example assumes that the seal width (L) is 1 inch and seal thickness (t) is 0.030 inch. The thermal excursion of the bimetallic seal can then be determined by the following equation:

$$\delta = (3/4t) L^2 (\Delta T)(\Delta \alpha)$$

Substituting all the numerical values, $\delta$ can be determined to equal 0.05 inches. Therefore with these two metals at a 1000° a gap of up to 0.050 would be filled without any help from pressure differentials across the seal.

It is also possible calculate the maximum bending stress ($\theta_{total}$) in the above exemplary seal. This should be done to reveal whether the bimetallic seal would exceed its yield strength as a result of thermal and pressure induced stresses. If the above seal was installed in contact with the sealing surface as shown in FIG. 9 and a 50 pounds per square inch pressure differential (W) existed across the seal one could calculate the maximum bending stress with the following equations:

$$M_{max} = (\tfrac{1}{8}) W L^2$$

Substituting the numerical values, the maximum bending moment ($M_{max}$) is 6.25 inch-pounds, the pressure induced bending stress ($\theta_{bend}$) is $$\theta_{bend} = (6M/t^2) = 41.7 \text{ ksi}.$$

and the thermal induced stress ($\theta_{thermal}$) is $\theta_{thermal} = 0.5 \alpha E \Delta T = 25.8$ ksi. where E is the modulus of elasticity.

Therefore the total stress on the leaf seal is: $\theta_{total} = 41.7 + 25.8 = 77.5$ ksi(maximum)

The material properties of the bimetallic seal are as follows:

INCO 718 0.2% strain, yield strength = 124 ksi at 1000F.

A286 0.2% strain, yield strength = 98 ksi at 1000F.

The maximum likely stress on the bimetallic seal is therefore far below the yield strength of the materials and stress induced failure of the seal should not occur.

This example demonstrates that the bimetallic leaf seal overcomes a major problem of conventional seals, the necessity of trading sealing ability for structural strength. The bimetallic seal described above will close a much larger initial gap (with a given seal thickness) than a conventional seal since the total available deflection is the addition of the thermal deflection and the pressure generated deflection. The bimetallic seal can be made more rugged (i.e. 0.30 versus 0.01 inch thickness typical) than conventional seals due to the ability of the seal to close the leakage gap from thermal generated movement. This improves seal life, tolerances and reliability.

A further advantage of this seal is that the it can be fabricated from existing commercially available materials. Advanced high temperature bimetallic materials can be fabricated using recently developed high temperature coating techniques such as plasma spray. A whole range of nickel based alloys and stainless steel materials can be bonded together to produce a range of bimetallic seals suitable for a wide variety of uses. Seals of this nature can be specially designed to provide positive sealing in very high temperature environments such as jet engine and rocket exhausts. The invention, therefore, should not be limited to the example given for use with a 2-D jet engine exhaust nozzle. There are a large variety of aero-space structures that requires high temperature seals to prevent exhaust air leakage.

Conventional methods of sealing between adjacent movable or fixed structures in aircraft or spacecraft engines have not been fully successful in all environments. This is largely due to the hostile environment to which the seals are subjected. A further advantage of this seal stems from its use of high quality metals capable of withstanding high temperatures and pressures. Use of these materials greatly lowers the likelihood of seal loss due to yielding or blowout of the seal.

Further, since bimetallic seals are thermally activated to respond the dynamic changes in conditions they are extremely reliable. Thermal changes are predictable and repeatable and therefore will always drive the seal in the preferred sealing direction as determined by the coefficients of thermal expansions of the seal materials.

While the invention has been particularly described with reference to the preferred embodiments thereof it will be understood by those skilled in the art that various changes in substance and form can be made therein without departing from the spirit and scope of the invention as detailed in the appended claims. For example, the invention should not be limited to bimetallic seals comprising nickel alloys and stainless steels. In some instances, other metallic materials for perhaps even plastic or carbon fiber materials may be appropriate for the seal environment.

We claim:

1. A leaf seal for use in a high temperature aircraft engine environment, said leaf seal comprising two distinct metallic layers having substantially different coefficients of expansions which cause said leaf seal to bend in a preferred direction upon the application of heat in order to close a gap and form an air seal between adjoining structures wherein at least one of said adjoining structures is movable and wherein said leaf seal is cantilevered from one of said adjoining structures and can withstand temperatures exceeding 1000° F., and further comprises sealing edge stabilizing means that prevents excessive lengthwise warping of the seal due to the differential expansion of the two metallic layers.

2. The leaf seal of claim 1 wherein said seal is more than 0.010 inches thick.

3. The leaf seal of claim 1 wherein the sealing edge stabilizing means comprises a geometric reversal of the two differing metallic layers.

4. A leaf seal for use in a high temperature aircraft engine environment, said leaf seal comprising two distinct metallic layers having substantially different coefficients of expansion which cause said leaf seal to bend in a preferred direction upon the application of heat in order to form an air seal between adjoining structures wherein said leaf seal withstands temperatures exceeding 1000° F. and comprises periodic slots penetrating only the metallic layer of said leaf seal having the greater coefficients of thermal expansion in order to reduce lengthwise warping of the seal.

5. The leaf seal of claim 1 wherein one of the layers comprises stainless steel.

6. The leaf seal of claim 1 wherein one of the layers comprises a nickel based alloy.

7. The leaf seal of claim 5 wherein one of the layers comprises a nickel based alloy.

8. The leaf seal of claim 1 wherein said seal is utilized to close air gaps between components of a jet engine exhaust nozzle.

9. The air seal of claim 1 wherein one metallic layer comprises an INCONEL series nickel based alloy and the other metallic layer comprises a high temperature tolerant stainless steel.

10. The air seal of claim 1 wherein differential air pressure across the seal improves its sealing ability.

* * * * *